United States Patent
Itoh

(10) Patent No.: US 6,219,190 B1
(45) Date of Patent: Apr. 17, 2001

(54) ZOOM LENS

(75) Inventor: Yoshinori Itoh, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,372

(22) Filed: Nov. 3, 1999

(30) Foreign Application Priority Data

Nov. 6, 1998 (JP) .................................... 10-331964
Nov. 1, 1999 (JP) .................................... 11-310812

(51) Int. Cl.$^7$ .................................... G02B 15/14
(52) U.S. Cl. .................... 359/692; 359/686; 359/689; 359/691
(58) Field of Search .................... 359/692, 686, 359/689, 691, 676, 683

(56) References Cited

U.S. PATENT DOCUMENTS

| | | | |
|---|---|---|---|
| 5,055,868 | 10/1991 | Itoh et al. | 354/222 |
| 5,218,478 | 6/1993 | Itoh | 354/692 |
| 5,274,504 | 12/1993 | Itoh | 359/676 |
| 5,305,148 | 4/1994 | Ikemori et al. | 359/689 |
| 5,365,376 | 11/1994 | Itoh | 359/686 |
| 5,574,599 | 11/1996 | Hoshi et al. | 359/689 |
| 5,585,971 | 12/1996 | Itoh | 359/692 |
| 5,587,840 | 12/1996 | Itoh | 359/686 |
| 5,687,027 | 11/1997 | Itoh | 359/692 |
| 5,815,320 | 9/1998 | Hoshi et al. | 359/686 |
| 5,831,772 | 11/1998 | Nishio et al. | 359/689 |
| 5,844,725 | 12/1998 | Itoh | 359/692 |
| 6,008,953 | 12/1999 | Itoh | 359/692 |
| 6,067,196 * | 5/2000 | Yamamoto | 359/565 |

FOREIGN PATENT DOCUMENTS

| | | |
|---|---|---|
| 56-128911 | 10/1981 | (JP) . |
| 57-201213 | 12/1982 | (JP) . |
| 60-170816 | 9/1985 | (JP) . |
| 60-191216 | 9/1985 | (JP) . |
| 62-56917 | 3/1987 | (JP) . |
| 2-50118 | 2/1990 | (JP) . |
| 2-71220 | 3/1990 | (JP) . |
| 2-190812 | 7/1990 | (JP) . |
| 4-145408 | 5/1992 | (JP) . |
| 4-213421 | 8/1992 | (JP) . |
| 6-324262 | 11/1994 | (JP) . |
| 9-197274 | 7/1997 | (JP) . |
| 9-211329 | 8/1997 | (JP) . |

* cited by examiner

*Primary Examiner*—Georgia Epps
*Assistant Examiner*—Michael A Lucas
(74) *Attorney, Agent, or Firm*—Fitzpatrick, Cella, Harper & Scinto

(57) ABSTRACT

A zoom lens is composed of a plurality of lens units. The plurality of lens units includes a movable lens unit having a negative refractive power lying closest to an image side. The movable lens unit has, in order from an object side, a first diffractive optical element and a second diffractive optical element. Where $C_{2a}$ is a phase coefficient in the second order in an equation for phase shape of the first diffractive optical element and $C_{2b}$ is a phase coefficient in the second order in an equation for phase shape of the second diffractive optical element, the following condition is satisfied:

$$0.7 < |C_{2b}|/|C_{2a}| < 3.0,$$

and the equation for phase shape is expressed by $$\phi(h) = (2\pi/\lambda)(C_2 \cdot h^2 + C_4 \cdot h^4 + \ldots + C_n \cdot h^n)$$

where h is a height from an optical axis, $\lambda$ is a reference wavelength, $C_n$ is a phase coefficient in the n-th order, and $\phi(h)$ is the phase shape.

16 Claims, 11 Drawing Sheets

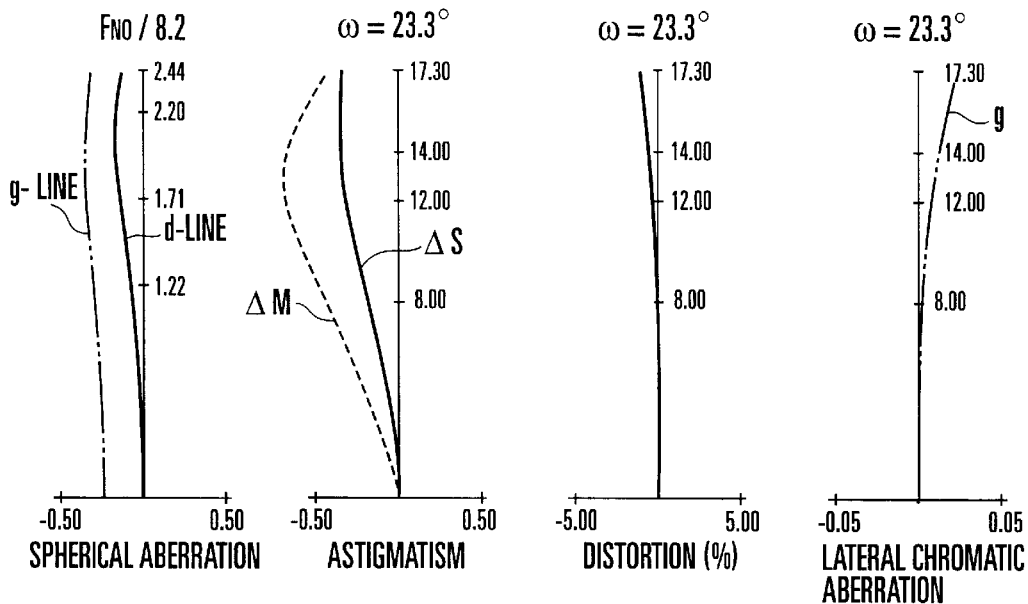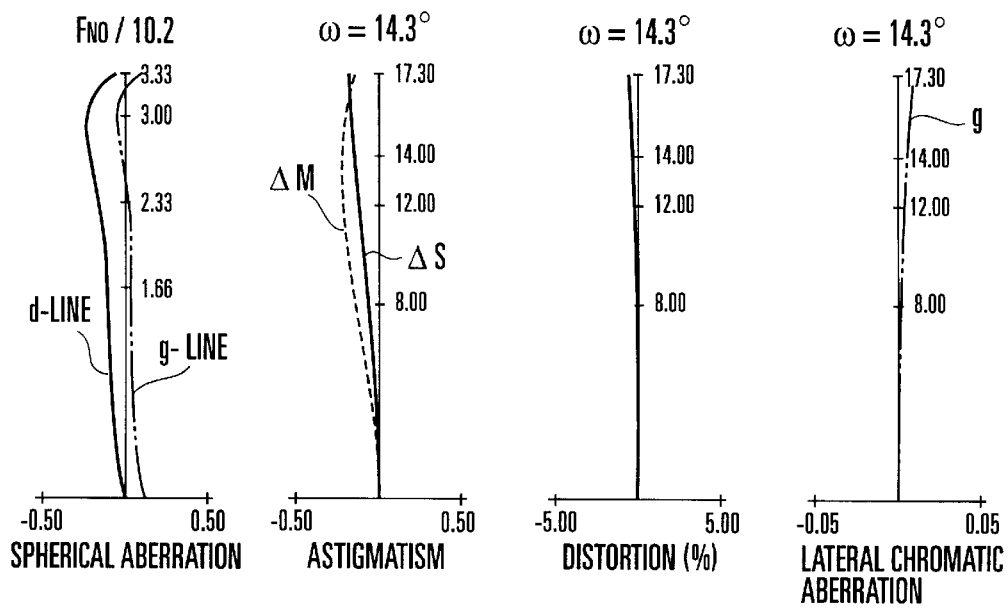

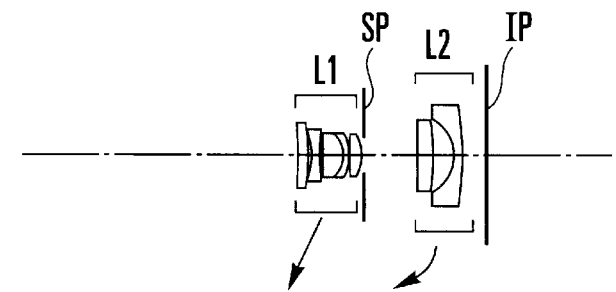
FIG.9A
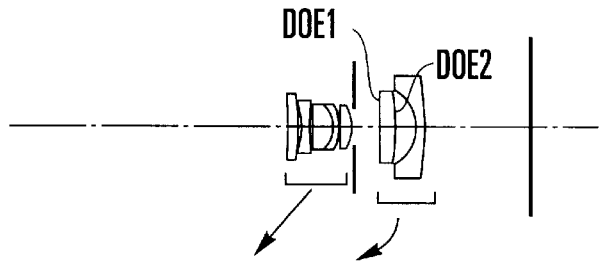
FIG.9B
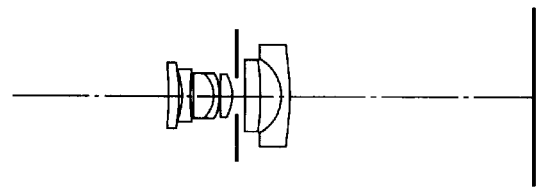
FIG.9C
FIG.10A   FIG.10B   FIG.10C   FIG.10D
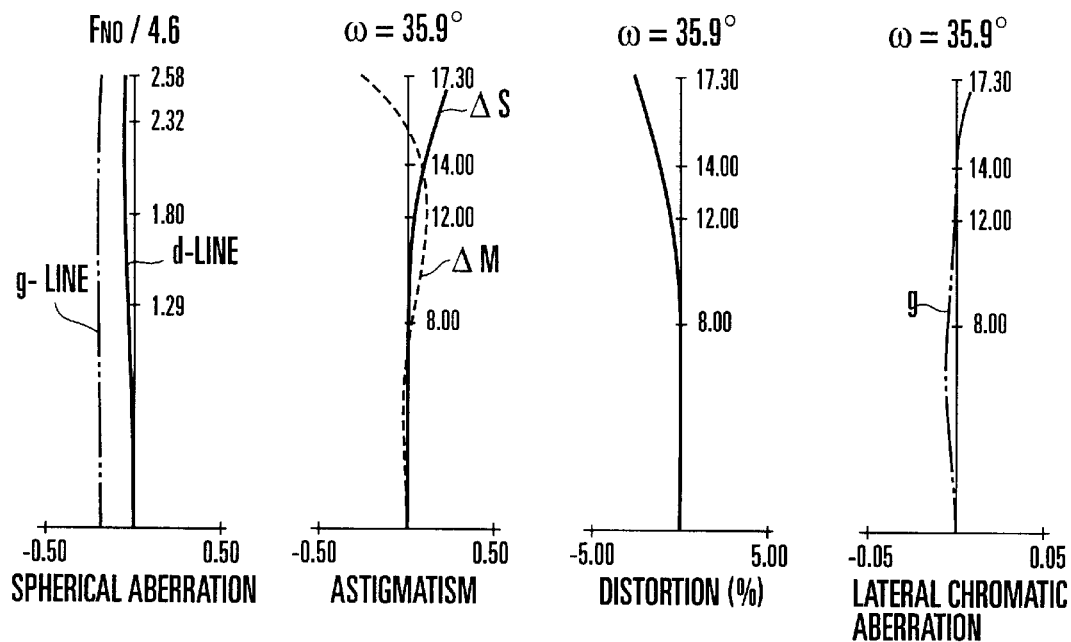

ZOOM LENS

BACKGROUND OF THE INVENTION

1. Field of the Invention

The present invention relates to zoom lenses suited to lens-shutter cameras, video cameras and the like and, more particularly, to zoom lenses having with a movable lens unit of positive refractive power disposed closest to the object side and a lens unit of negative refractive power disposed closest to the image side.

2. Description of Related Art

Recently, the use of aspherical zoom lenses has prevailed in lens-shutter cameras, video cameras and the like with the results that the number of lens members is reduced, the total length of the entire lens system is shortened, and the structure of construction is simplified. Accordingly, compact zoom lenses, while still extending the zooming range, have been increasing in variety.

Of these zoom lenses, such as a simple zoom lens for a lens-shutter camera, there have been proposed a number of two-unit zoom lenses, each of which consists of, in order from the object side, a first lens unit of positive refractive power and a second lens unit of negative refractive power, totaling two lens units, wherein the first and second lens units each axially move in differential relation to vary the focal length with the total length being kept relatively short.

Such two-unit zoom lenses have been proposed in, for example, Japanese Laid-Open Patent Applications No. Sho 56-128911, No. Sho 57-201213, No. Sho 60-170816, No. Sho 60-191216, No. Sho 62-56917, No. Hei 2-50118, No. Hei 2-71220, No. Hei 2-190812 and No. Hei 4-145408.

Now, of the various aberrations, chromatic aberrations are corrected by combining lenses made of glass materials which differ from each other in dispersion. Besides this correction method, there is another method of correcting the chromatic aberrations of a lens by introducing a diffractive optical element, as the diffractive optical element is formed on a refractive surface of the lens or on a parallel flat plate of the lens. Such a diffraction-refraction type of optical system has previously been proposed in, for example, Japanese Laid-Open Patent Applications No. Hei 4-213421, No. Hei 6-324262, No. Hei 9-197274 and No. Hei 9-211329.

In particular, in the above Japanese Laid-Open Patent Application No. Hei 9-211329, there is disclosed a two-unit zoom lens consisting of a first lens unit of positive refractive power and a second lens unit of negative refractive power, wherein one diffractive optical element is used in the second lens unit. Also, in the above Japanese Laid-Open Patent Application No. Hei 9-211329, it is suggested that a plurality of diffractive optical elements may be used in the second lens unit, but, nothing more is taught about how to apply, for example, two diffractive optical elements to the second lens unit to improve the performance of the zoom lens.

BRIEF SUMMARY OF THE INVENTION

An object of the invention is to provide a zoom lens having a plurality of diffractive optical elements made to produce greater advantages.

Particularly, for the two-unit or three-unit type zoom lens, the invention utilizes a plurality of diffractive optical elements in a novel fashion, thereby making it possible to attain a high range, while still permitting a high performance to be maintained throughout.

The zoom lens according to the invention has features that a negative lens unit, among a plurality of lens units, which lies closest to the image side and moves during zooming has two diffractive optical elements and that these diffractive optical elements are arranged in such a manner as to minimize or correct lateral chromatic aberration and, moreover, as not to much vary the amount of lateral chromatic aberration with zooming.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 3A to 3D are graphic representations of the aberrations of the numerical example 1 of the invention at a middle focal length position.

FIGS. 4A to 4D are graphic representations of the aberrations of the numerical example 1 of the invention at the telephoto end.

FIGS. 9A to 9C are longitudinal section views of a numerical example 3 of the zoom lens of the invention in three different operative positions.

FIGS. 10A to 10D are graphic representations of the aberrations of the numerical example 3 of the invention at the wide-angle end.

DETAILED DESCRIPTION OF THE INVENTION

Hereinafter, preferred embodiments of the invention will be described in detail with reference to the drawings.

Figure 1A:
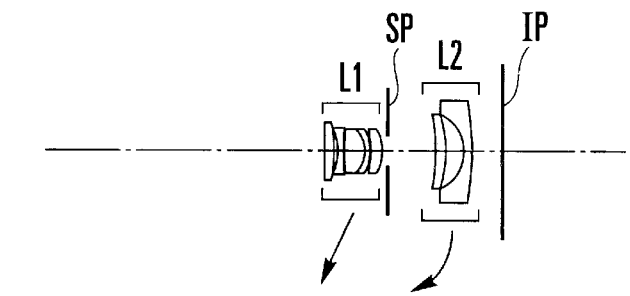
FIGS. 1A to 1C are longitudinal section views of a numerical example 1 of the zoom lens of the invention in three different operative positions.
Figure 1B:
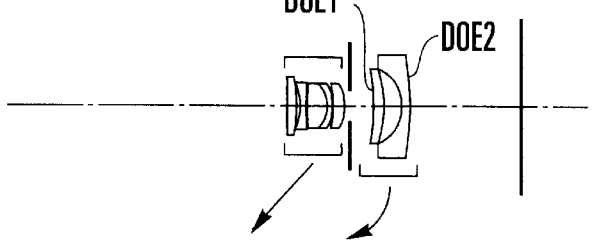
Figure 1C:
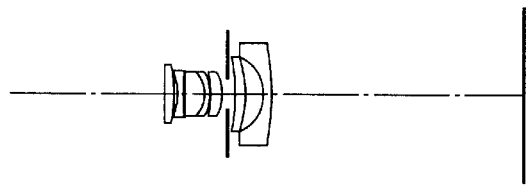
Figures 2A, 2B, 2C, 2D:
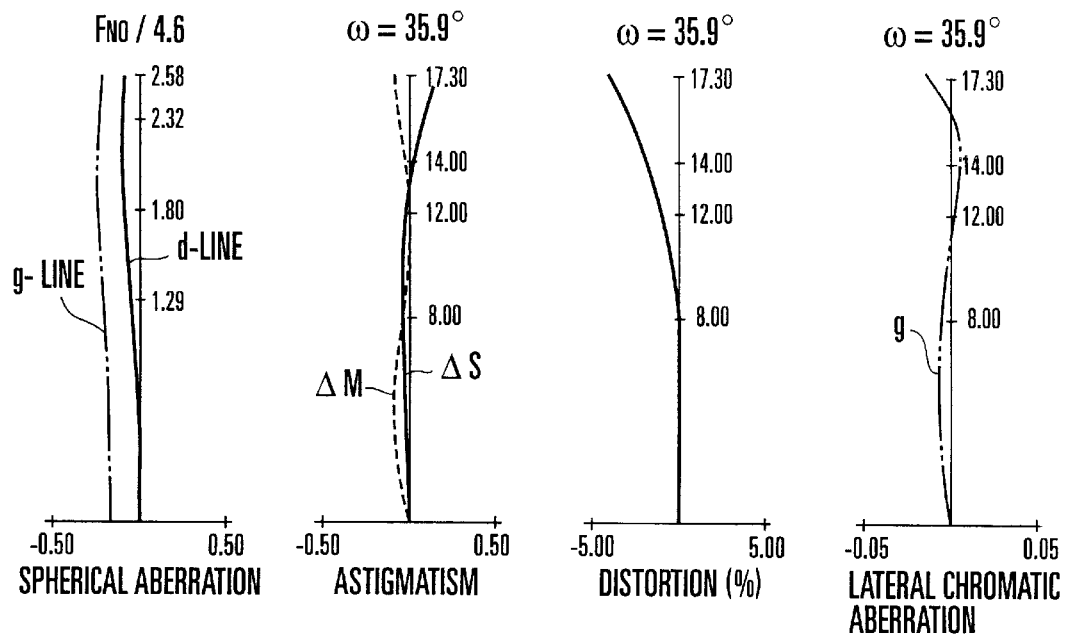
FIGS. 2A to 2D are graphic representations of the aberrations of the numerical example 1 of the invention at the wide-angle end.

FIGS. 1A to 1C are longitudinal section views of a numerical example 1 of the zoom lens according to the invention at the wide-angle end, in a middle focal length position and at the telephoto end, respectively. The aberrations of the numerical example 1 of the zoom lens in these positions are shown in FIGS. 2A to 2D through FIGS. 4A to 4D, respectively.

Figure 5A:
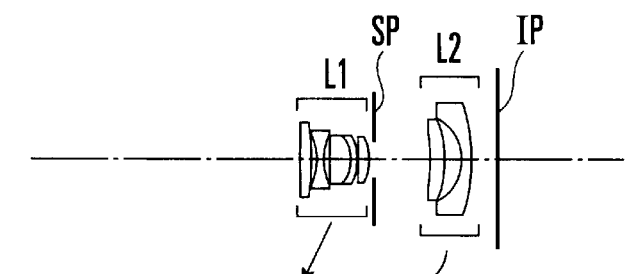
FIGS. 5A to 5C are longitudinal section views of a numerical example 2 of the zoom lens of the invention in three different operative positions.
Figure 5B:
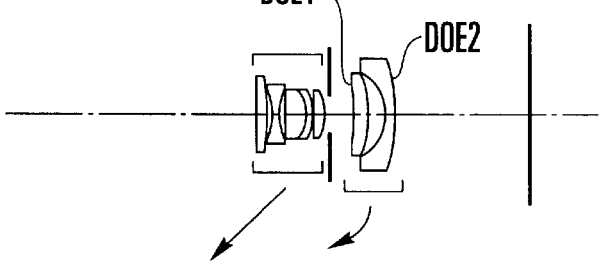
Figure 5C:
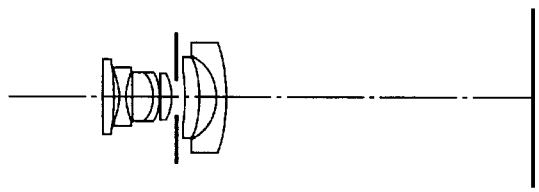
Figures 6A, 6B, 6C, 6D:
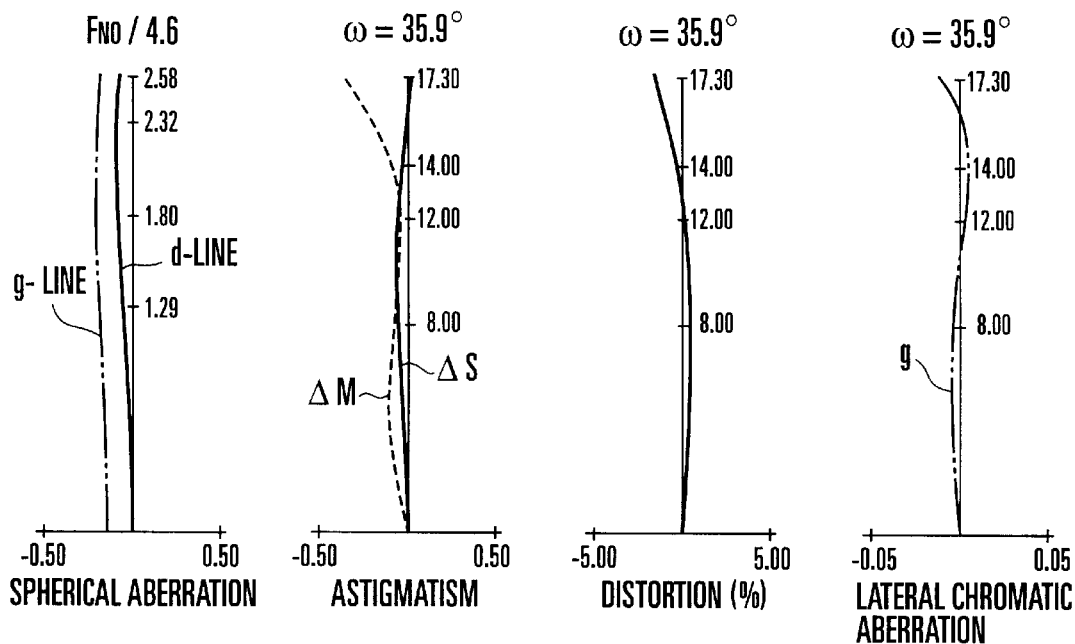
FIGS. 6A to 6D are graphic representations of the aberrations of the numerical example 2 of the invention at the wide-angle end.
Figures 7A, 7B, 7C, 7D:
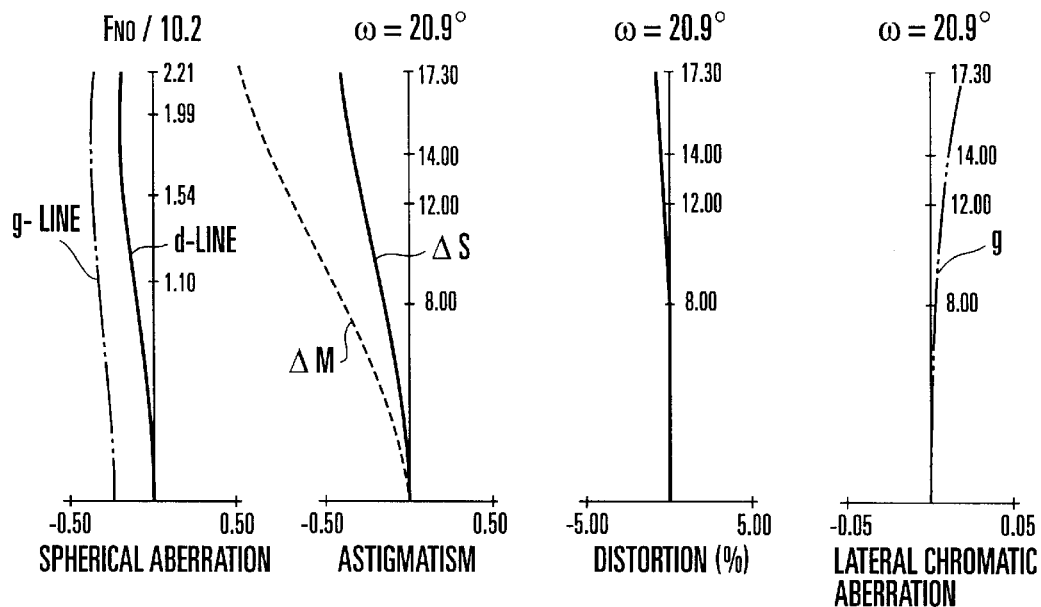
FIGS. 7A to 7D are graphic representations of the aberrations of the numerical example 2 of the invention in a middle focal length position.
Figures 8A, 8B, 8C, 8D:
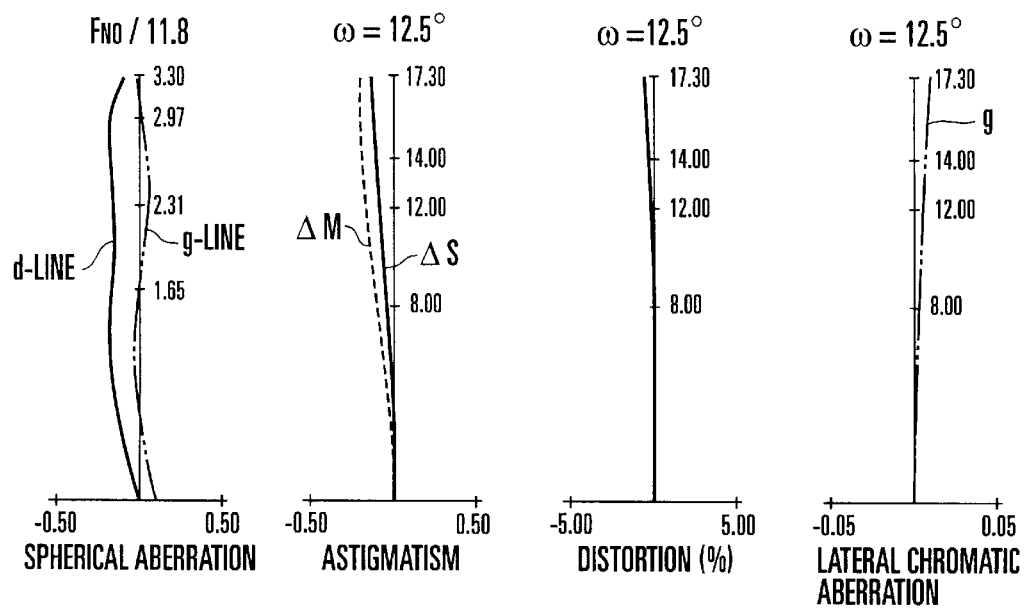
FIGS. 8A to 8D are graphic representations of the aberrations of the numerical example 2 of the invention at the telephoto end.
Figures 11A, 11B, 11C, 11D:
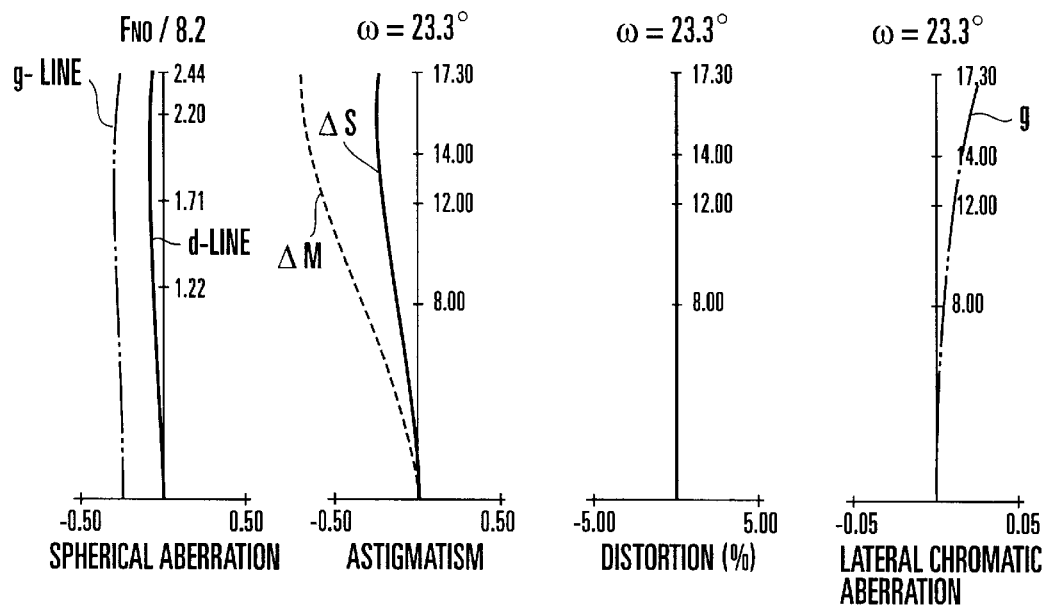
FIGS. 11A to 11D are graphic representations of the aberrations of the numerical example 3 of the invention at a middle focal length position.
Figures 12A, 12B, 12C, 12D:
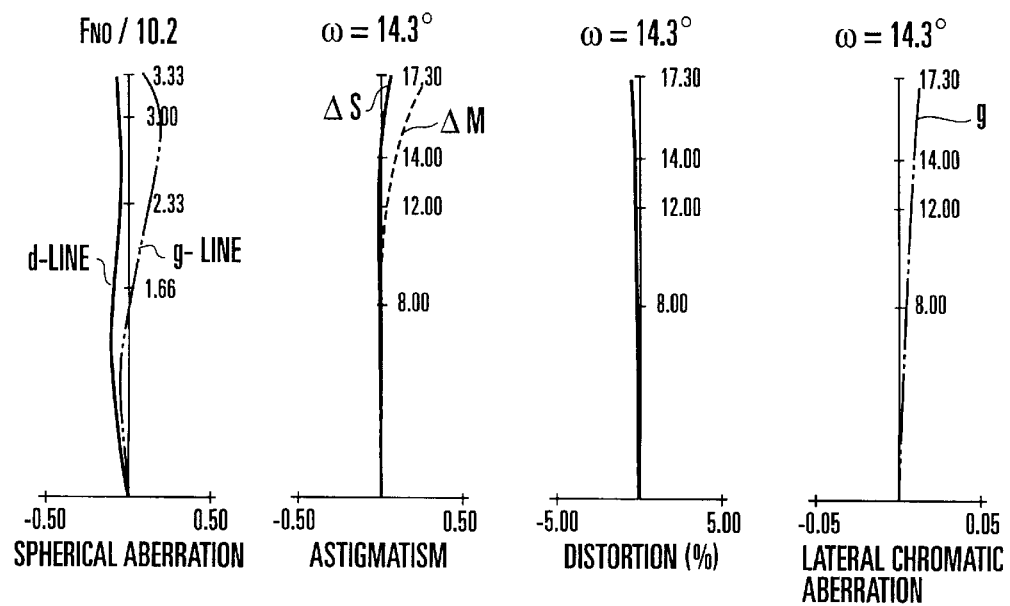
FIGS. 12A to 12D are graphic representations of the aberrations of the numerical example 3 of the invention at the telephoto end.

FIGS. 5A to 5C are longitudinal section views of a numerical example 2 of the zoom lens according to the invention at the wide-angle end, in a middle focal length position and at the telephoto end, respectively. The aberrations of the numerical example 2 of the zoom lens in these positions are shown in FIGS. 6A to 6D through FIGS. 8A to 8D, respectively.

FIGS. 9A to 9C are longitudinal section views of a numerical example 3 of the zoom lens according to the invention at the wide-angle end, in a middle focal length position and at the telephoto end, respectively. The aberrations of the numerical example 3 of the zoom lens in these positions are shown in FIGS. 10A to 10D through FIGS. 12A to 12D, respectively.

In FIGS. 1A to 1C, FIGS. 5A to 5C and FIGS. 9A to 9C, the zoom lens comprises, in order from the object side, a first lens unit L1 of positive refractive power and a second lens unit L2 of negative refractive power. Both the lens units L1 and L2 axially move toward the object side, as illustrated by the arrows, while decreasing the separation therebetween, so as to vary the magnification from the wide-angle end to the telephoto end.

A stop SP moves in unison with the first lens unit L1 during zooming. IP stands for the image plane.

In the numerical examples 1, 2 and 3 shown in FIGS. 1A to 1C, FIGS. 5A to 5C and FIGS. 9A to 9C, the second lens unit L2 is provided with two diffractive optical elements of positive refractive power and negative refractive power. Therefore, despite the number of constituent lenses in the second lens unit being reduced to two, the chromatic aberrations are corrected well.

In the numerical examples 1, 2 and 3 shown in FIGS. 1A to 1C, FIGS. 5A to 5C and FIGS. 9A to 9C, the first lens unit L1 is constructed with a positive lens having a convex surface facing the image side, a negative lens having a concave surface facing the object side, a cemented lens composed of a positive lens having a convex surface facing the image side and a negative meniscus lens convex toward the image side, and a positive meniscus lens convex toward the image side.

Further, the second lens unit L2 is constructed with a positive front lens of meniscus form convex toward the image side and a negative rear lens of meniscus form convex toward the image side.

Moreover, in the numerical examples 1 and 2, a diffractive optical element DOE1 is provided on a lens surface on the object side of the front lens in the second lens unit, and another diffractive optical element DOE2 is provided on a lens surface on the image side of the rear lens in the second lens unit.

Also, in the numerical example 3, diffractive optical elements DOE1 and DOE2 are respectively provided on both lens surfaces of the front lens in the second lens, as the axial thickness of the front lens is thick.

In each of the numerical examples 1, 2 and 3, the diffractive optical elements DOE1 and DOE2 are made to be binary optics in a saw-tooth form or kinoform, or in a stepped form. To fabricating the diffractive optical elements DOE1 and DOE2, a lithographic or machining method may be employed. In addition, a master grating made by such a method may be used in molding.

Also, the shape of the diffractive optical element DOE1 or DOE2 is expressed by the following equation for the phase $\phi(h)$:

$$\phi(h) = (2\pi/\lambda)(C_2 \cdot h^2 + C_4 \cdot h^4 + \ldots + C_{(2i)} h^{2i})$$

where $\lambda$ is a reference wavelength (spectral d-line), and h is a distance from the optical axis.

The dispersion vd of the diffractive optical element DOE1 or DOE2 is given by the following equation:

$$vd = \lambda d/(\lambda F - \lambda C) = -3.45$$

where $\lambda d$, $\lambda C$ and $\lambda F$ are the wavelengths of the spectral d-line, C-line and F-line.

In each of the numerical examples 1, 2 and 3, the chromatic aberrations produced by the refractive surfaces of each lens are corrected by the diffractive optical element that exhibits a dispersion of the opposite sign to that of the dispersions of the usual glass materials.

In the two-unit zoom lenses shown in FIGS. 1A to 1C, FIGS. 5A to 5C and FIGS. 9A to 9C, during zooming from one end to the other, the height of that part of the off-axial light beam which travels through the second lens unit varies to a large extent. For this reason, the lateral chromatic aberration varies with zooming. To correct this variation, if the lens system only is to be used, there is a limitation on the correction. In each of the numerical examples 1, 2 and 3, therefore, use is made of two diffractive optical elements in the second lens unit, thus minimizing this variation.

These two diffractive optical elements are made to have their positions at the ones of the lens surfaces which differ in the height of incidence of the off-axial light rays from each other and which are separated by a relatively large distance on the optical axis. By this arrangement, the lateral and longitudinal chromatic aberrations the second lens unit would otherwise produce both are corrected well.

In each of the numerical examples 1 and 2, the diffractive optical elements are respectively provided on a lens surface closest to the object side and a lens surface closest to the image side in the second lens unit L2. These examples are taken to display the above-described effect of correcting aberrations at a maximum. In the numerical example 3, the diffractive optical elements are respectively provided on both lens surfaces of the positive front lens in the second lens unit L2. This example is to assemble the diffractive optical elements intensively on one lens member, thus making it easier to manufacture them.

In each of the numerical examples 1, 2 and 3, the lens surfaces that are to be used for the diffractive optical elements are made aspherical. This leads to improving the image quality in such a manner that the diffractive optical elements correct chromatic aberrations, while the aspheric surfaces correct spherical aberration and coma well.

Although, in each of the numerical examples 1, 2 and 3, the first lens unit L1 is all constructed with refractive optical elements (or lenses), one or more diffractive optical elements may be used in the first lens unit L1.

To achieve further improvements of the optical performance, in each of the numerical examples 1, 2 and 3, additional rules of design for the optical system are set forth as follows. Incidentally, in the numerical examples 1, 2 and 3, as is apparent from their data which will be given later, the optical systems are made up so as to satisfy part of the following features or conditions.

Letting the height from the optical axis be denoted by h, the reference wavelength be denoted by $\lambda$ and the phase coefficient in the n-th order be denoted by $C_n$, and expressing the phase shape $\phi(h)$ of the diffractive optical element by $$\phi(h)=(2\pi/\lambda)(C_2 \cdot h^2 + C_4 \cdot h^4 + C_6 \cdot h^6 + \ldots),$$

the following conditions are satisfied:

$$C_{2a}<0 \quad (1)$$

$$C_{2b}>0 \quad (2)$$

where $C_{2a}$ and $C_{2b}$ are phase coefficients in the second order of the two diffractive optical elements DOE1 and DOE2 on the object side and the image side, respectively, provided in the negative lens unit lying closest to the image side.

The inequalities of conditions (1) and (2) are concerned with the negative lens unit lying closest to the image side, and exhibit that, of the two diffractive optical elements to be used, the diffractive optical element DOE1 on the object side is positive in refractive power and the diffractive optical element DOE2 on the image side is negative in refractive power.

Particularly, in the numerical examples 1, 2 and 3, such two diffractive optical elements of positive and negative refractive power are used in the negative lens unit lying closest to the image side, thereby making it possible to correct well various aberrations including chromatic ones.

Letting the height from the optical axis be denoted by h, the reference wavelength be denoted by $\lambda$ and the phase coefficient in the n-th order be denoted by $C_n$, and expressing the phase shape $\phi(h)$ of the diffractive optical element by $$\phi(h)=(2\pi/\lambda)(C_2 \cdot h^2 + C_4 \cdot h^4 + C_6 \cdot h^6 + \ldots),$$

the following condition is satisfied:

$$-9\times10^{-2}<C_{2a}\times fw<-5\times10^{-3} \quad (3)$$

where $C_{2a}$ is a phase coefficient in the second order of the diffractive optical element DOE1 on the object side, and fw is the focal length at the wide-angle end of the entire lens system.

When the upper limit of the condition (3) is exceeded, as this means that the refractive power of the diffractive optical element is too strong, it becomes difficult to correct spherical aberration at or near the telephoto end.

When the refractive power of the diffractive optical element is too weak beyond the lower limit of the condition (3), the effect of correcting chromatic aberrations by using the diffractive optical element comes to be diminished.

Incidentally, it is more preferred in the invention to satisfy the following condition:

$$-8\times10^{-2}<C_{2a}\times fw<-1\times10^{-2} \quad (3a).$$

Letting the height from the optical axis be denoted by h, the reference wavelength be denoted by $\lambda$ and the phase coefficient in the n-th order be denoted by $C_n$, and expressing the phase shape $\phi(h)$ of the diffractive optical element by $$\phi(h)=(2\pi/\lambda)(C_2 \cdot h^2 + C_4 \cdot h^4 + C_6 \cdot h^6 + \ldots),$$

the following condition is satisfied:

$$0.7<|C_{2b}|/|C_{2a}|<3.0 \quad (4)$$

where $C_{2a}$ and $C_{2b}$ are phase coefficients in the second order of the two diffractive optical elements DOE1 and DOE2 on the object side and the image side, respectively, provided in the negative lens unit lying closest to the image side.

The inequalities of condition (4) give a proper range for the ratio of the refractive powers of the two diffractive optical elements and have an aim to correct well the variation of the lateral chromatic aberration with zooming.

For better results, it is preferred that the two diffractive optical elements DOE1 and DOE2 satisfy the following condition:

$$1.0<|C_{2b}|/|C_{2a}|<2.0 \quad (4a).$$

In the negative lens unit lying closest to the image side, the axial distance Dab between the two diffractive optical elements in terms of the focal length fw at the wide-angle end of the entire lens system lies in the following range:

$$0.05<D_{ab}/fw<0.6 \quad (5).$$

When the condition (5) is satisfied, the axial separation between the two diffractive optical elements is appropriately determined to correct well the variation of lateral chromatic aberration with zooming.

Incidentally, it is more preferred in the invention to satisfy the following condition:

$$0.1<D_{ab}/fw<0.4 \quad (5a).$$

Letting image magnifications at the wide-angle end and the telephoto end of the negative lens unit lying closest to the image side be denoted by $\beta2W$ and $\beta2T$, respectively, the following condition is satisfied:

$$2.3<\beta2T/\beta2W<4.5 \quad (6).$$

The inequalities of condition (6) give a proper range for the image magnifications at the wide-angle end and the telephoto end of the negative lens unit lying closest to the image side, and have an aim to correct all aberrations in good balance.

Incidentally, it is more preferred in the invention to satisfy the following condition:

$$2.7<\beta2T/\beta2W<3.5 \quad (6a).$$

The negative lens unit lying closest to the image side is constructed with a positive front lens and a negative rear lens, wherein the front and rear lenses each are provided with one diffractive optical element.

The positive lens unit lying closest to the object side is constructed only with refractive optical elements.

Figure 13:
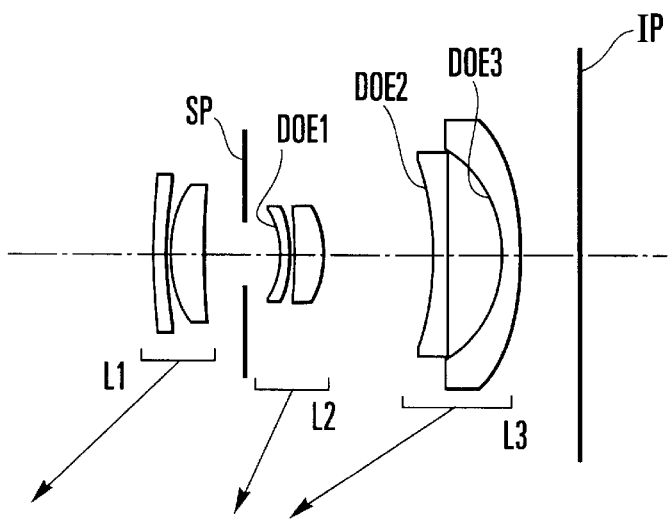
FIG. 13 is a longitudinal section view of a numerical example 4 of the zoom lens of the invention at the wide-angle end.
Figures 14A, 14B, 14C, 14D:
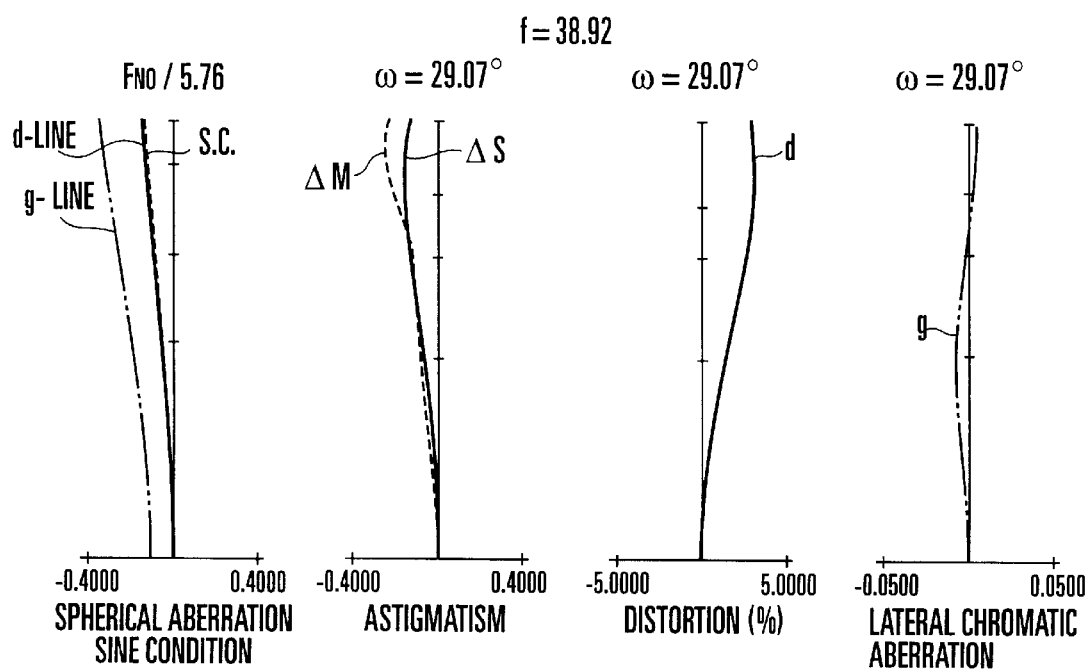
FIGS. 14A to 14D are graphic representations of the aberrations of the numerical example 4 of the invention at the wide-angle end.
Figures 15A, 15B, 15C, 15D:
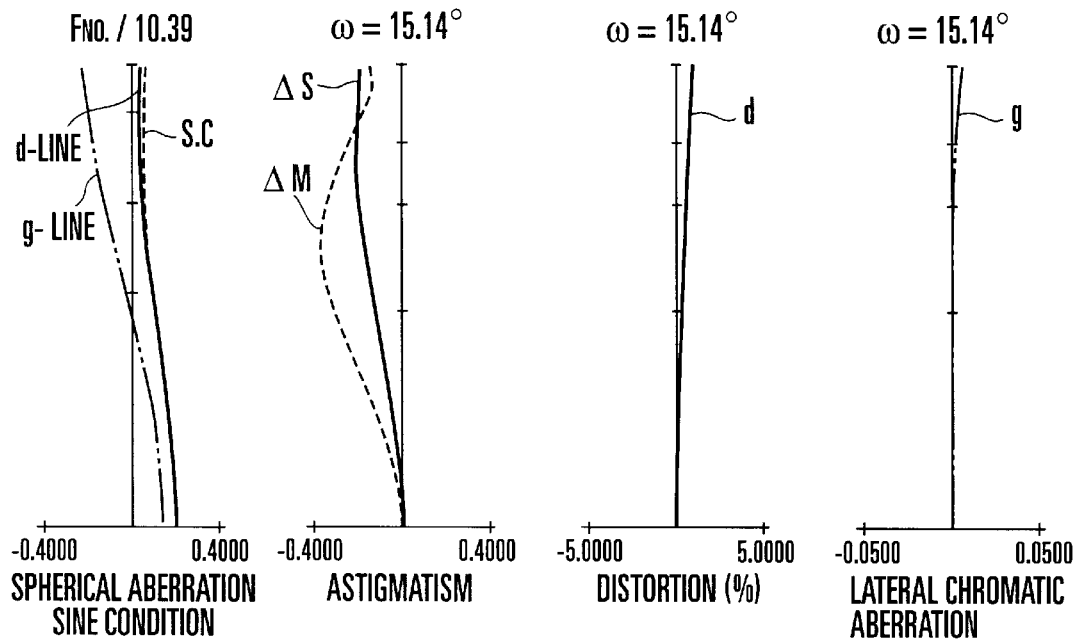
FIGS. 15A to 15D are graphic representations of the aberrations of the numerical example 4 of the invention in a middle focal length position.
Figures 16A, 16B, 16C, 16D:
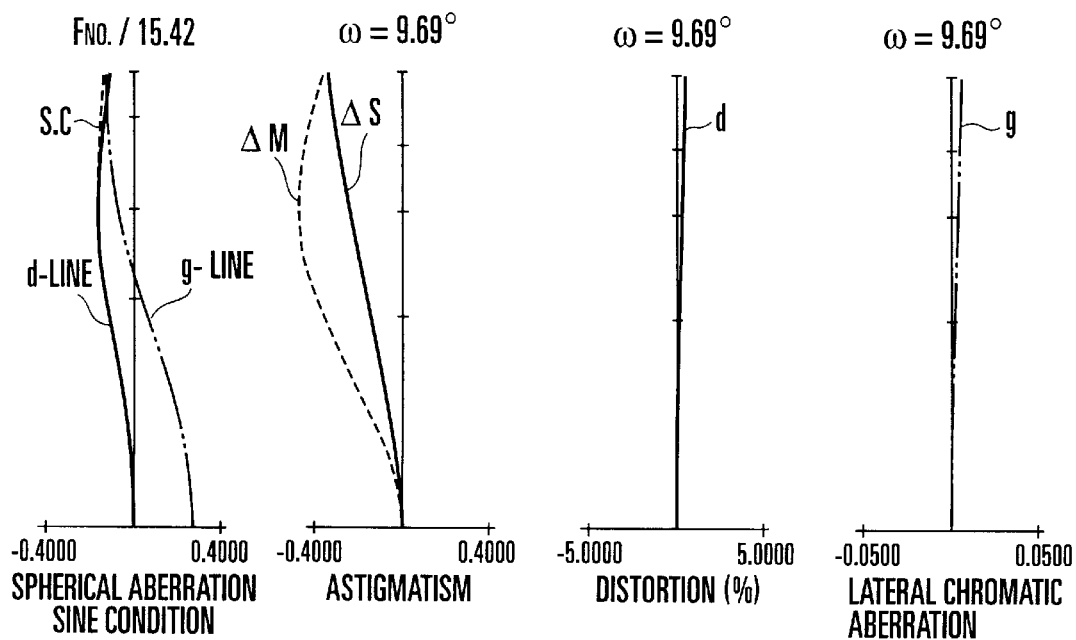
FIGS. 16A to 16D are graphic representations of the aberrations of the numerical example 4 of the invention at the telephoto end.

FIG. 13 is a longitudinal section view showing a numerical example 4 of the zoom lens of the invention. FIGS. 14A to 14D through FIGS. 16A to 16D graphically show the aberrations of the numerical 4 of the zoom lens at the wide-angle end, in a middle focal length position and at the telephoto end, respectively.

In FIG. 13, reference character L1 denotes a first lens unit having a positive refractive power lying closest to the object side, reference character L2 denotes a second lens unit having a positive refractive power, and reference character L3 denotes a third lens unit having a negative refractive power lying closest to the image side. A stop SP moves along with the first lens unit L1. IP stands for the image plane.

The numerical example 4 shown in FIG. 13 is a three-unit type zoom lens. The three lens units L1, L2 and L3 all move axially in differential relation to effect zooming.

In the numerical example 4 shown in FIG. 13, the positive second lens unit L2 is provided with a diffractive optical element having a positive refractive power, and the negative third lens unit L3 lying closest to the image side is provided with two diffractive optical elements each having a negative refractive power. By these three diffractive optical elements, the chromatic aberrations are corrected well.

Referring to FIG. 13, the first lens unit L1 comprises, in order from the object side, a meniscus lens of negative refractive power convex toward the object side and another meniscus lens of positive refractive power convex toward the object side. The second lens unit L2 comprises, in order from the object side, a meniscus lens of negative refractive power convex toward the image side and another meniscus lens of positive refractive power convex toward the image side. The third lens unit L3 comprises, in order from the object side, a meniscus lens of negative refractive power convex toward the image side and another meniscus lens of negative refractive power convex toward the image side.

In the second lens unit L2, the lens on the object side, i.e., the negative meniscus lens, is provided with a diffractive optical element DOE1 having a positive refractive power at the concave front surface (the sixth surface) thereof. In the third lens unit L3, the negative meniscus lens on the object side is provided with a diffractive optical element DOE2 having a negative refractive power at the concave front surface (the tenth surface) thereof, and the negative meniscus lens on the image side is provided with a diffractive optical element DOE3 having a negative refractive power at the concave front surface (the twelfth surface) thereof.

In addition, a convex surface on the object side (the first surface) of the lens on the object side, i.e., the negative meniscus lens in the first lens unit L1, a convex surface on the image side (the ninth surface) of the lens on the image side, i.e., the positive meniscus lens in the second lens unit L2, and a convex surface on the image side (the thirteenth surface) of the negative meniscus lens on the image side in the third lens unit L3 are each made to be an aspheric surface.

Figure 17:
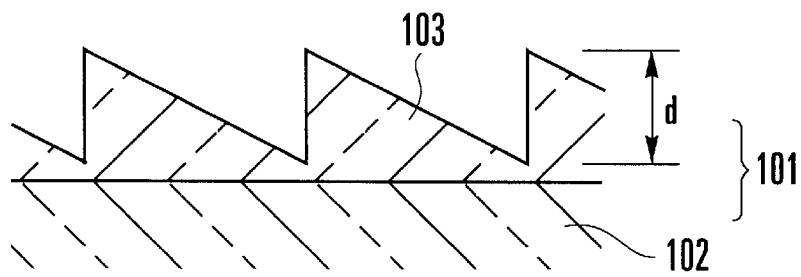
FIG. 17 is a sectional view showing the profile of a diffractive optical element according to the invention.
Figure 20:
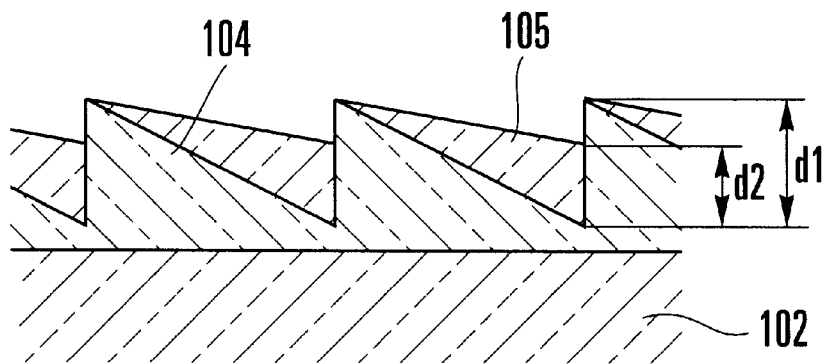
FIG. 20 is a sectional view showing the profile of another diffractive optical element according to the invention.

In the present invention, the diffractive optical element to be used may take the kinoform of either the monolayer type like that shown in FIG. 17, or the multilayer type like that shown in FIG. 20 in which two layers of different thicknesses or the same thickness but of different refractive indices and Abbe numbers from each other are stratified.

Figure 18:
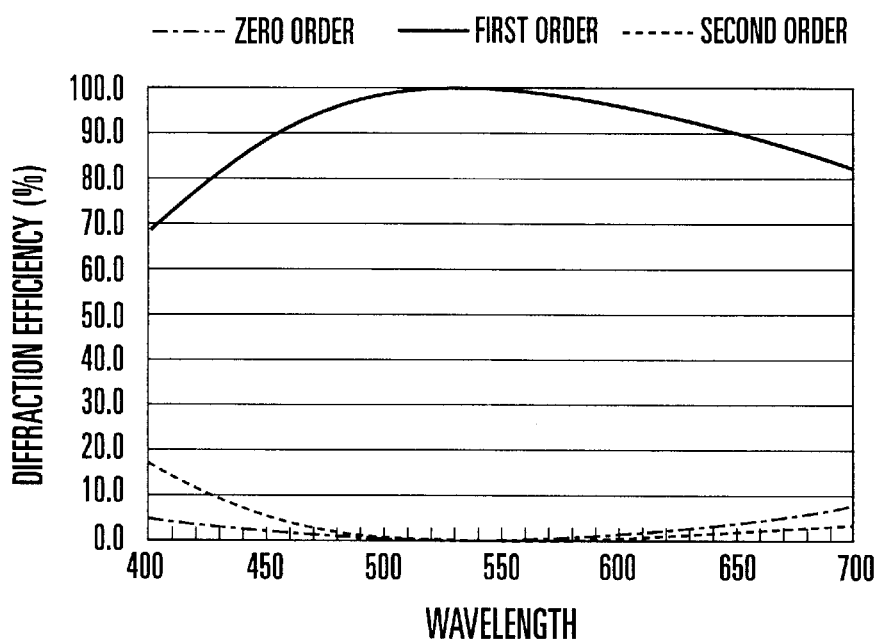
FIG. 18 is a graph of the wavelength response characteristics of the diffractive optical element shown in FIG. 17.

FIG. 18 is a graph showing the characteristics of the diffractive optical element 101 shown in FIG. 17, where the rays are diffracted in the first order with an efficiency depending on the wavelength. In actual practice, the diffractive optical element 101 is produced by applying an ultraviolet curable polymer to the surface of a substrate 102. Then, a layer of grooves 103 is formed to a thickness "d" so that the efficiency of the diffracted rays in the first order becomes 100% at a wavelength of 530 nm.

As is apparent from FIG. 18, the diffraction efficiency in the design order becomes progressively lower away from the optimized wavelength of 530 nm. Meanwhile, the diffraction efficiencies in different orders from the design one by ±1, or zero and second orders, rise increasingly. This increase of the relative intensities of the diffracted rays to that of the design order causes the production of flare and leads to lower the resolving power of the optical system.

Figure 19:
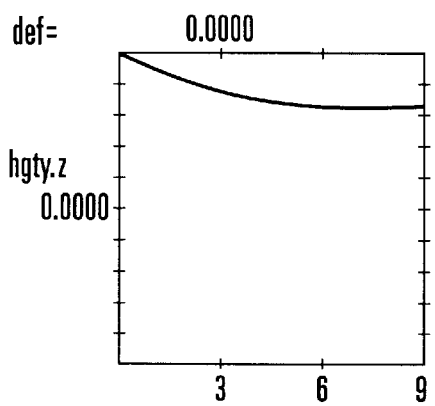
FIG. 19 is a graph of the MTF characteristic of the diffractive optical element shown in FIG. 17.

FIG. 19 shows the MTF characteristics with respect to the spatial frequency when the numerical example is made up in the grating form shown in FIG. 17. From FIG. 19, it is understandable that the MTF in the low frequency region slightly drops.

Figure 21:
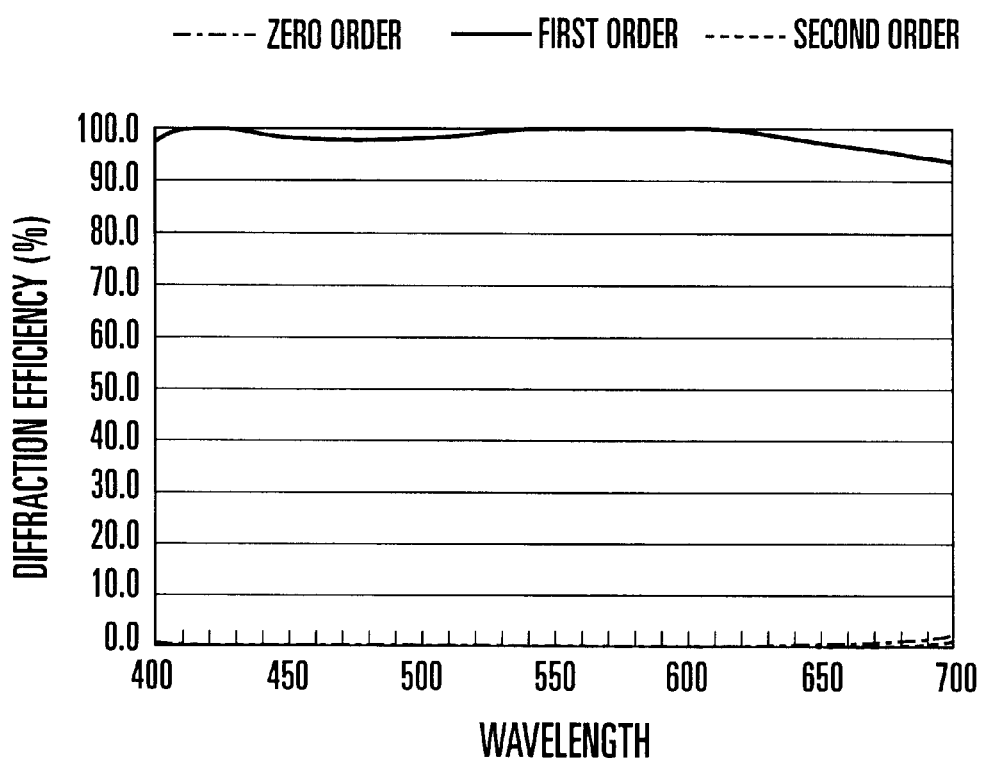
FIG. 21 is a graph of the wavelength response characteristics of the diffractive optical element shown in FIG. 20.

For another diffractive optical element which has two layers 104 and 105 stratified or is of the multilayer type shown in FIG. 20, the wavelength dependent characteristics of the diffraction efficiency in the first order are shown FIG. 21.

In FIG. 20, a first layer 104 made of an ultraviolet curable polymer (nd=1.499, vd=54) is formed on a substrate 102. As stacked on the first layer 104, there is formed a second layer 105 made of another ultraviolet curable polymer (nd=1.598, vd=28). In this combination of the materials, the grating thickness d1 of the first layer 104 is determined to be d1=13.8 μm, and the grating thickness d2 of the second layer 105 is determined to be d2=10.5 μm.

As is understandable from FIG. 21, the making of the diffractive optical element in the stratified structure increases the diffraction efficiency for the design order to higher than 95% over the entire range of useful wavelengths.

Figure 22:
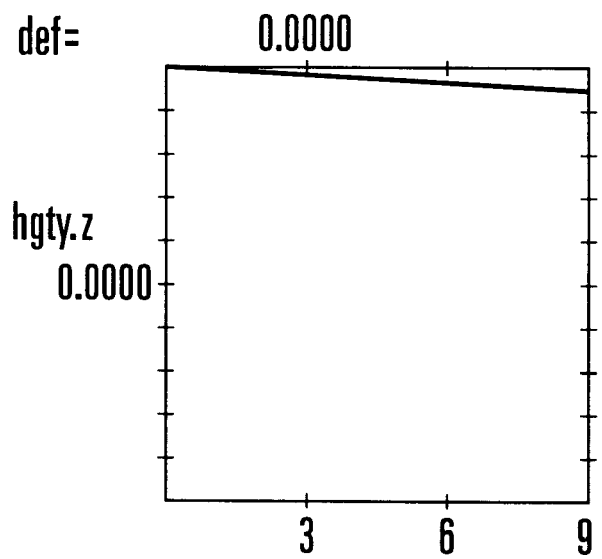
FIG. 22 is a graph of the MTF characteristic of the diffractive optical element shown in FIG. 20.

FIG. 22 shows the MTF characteristics with respect to the spatial frequency in a case where the numerical example is made up in the grating form shown in FIG. 20. By using the diffractive optical element of the stratified structure, the diffraction efficiency in the low frequencies is improved. The desired MTF characteristic is thus obtained. It will be appreciated from the foregoing that, according to the invention, if the diffractive optical elements to be used are of the stratified structure, the optical performance can be further improved.

It should be noted that, for the diffractive optical elements of the two-layer stratified structure described above, the material to be used is not limited to the ultraviolet curable polymer. Other materials such as plastics may be used instead. Moreover, though depending on the sort of substrate, the first layer 104 may be formed directly in the substrate. Furthermore, there is no need to differentiate all the grating thicknesses of the two layers from each other. In some combinations of materials, the two layers 104 and 105 may be made equal in grating thickness to each other as shown in FIG. 23.

Figure 23:
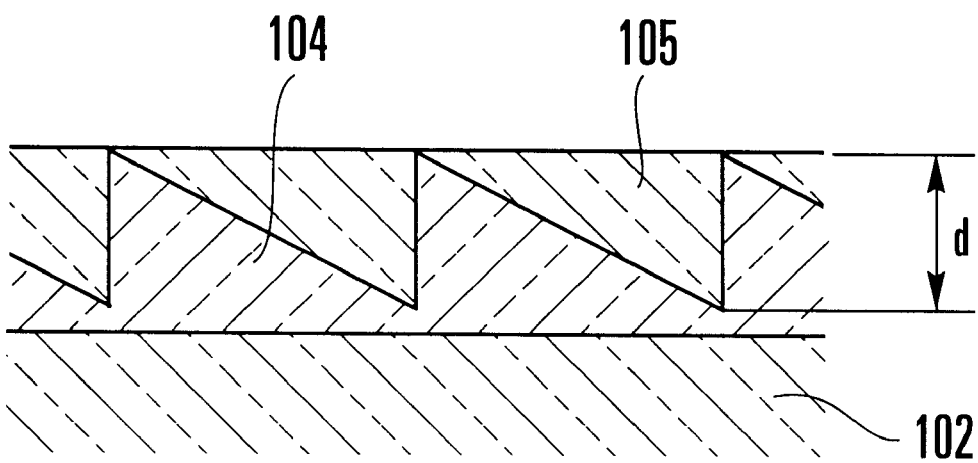
FIG. 23 is a sectional view showing the profile of still another diffractive optical element according to the invention.

In the case of using the diffractive optical element shown in FIG. 23, because the exposed surface to the air of the diffractive optical element is smooth without concave and convex portions, it is made possible to maintain an excellent dust proof condition, thus contributing to an increase of the productivity on the assembling line in manufacturing the diffractive optical elements.

Next, four numerical examples 1 to 4 of the invention are shown. In the numerical data for the numerical examples 1 to 4, Ri is the radius of curvature of the i-th lens surface, when counted from the object side, Di is the i-th lens thickness or air separation, when counted from the object side, and Ni and vi are respectively the refractive index and Abbe number of the material of the i-th lens element, when counted from the object side.

The values of the factors in the above-described conditions for the numerical examples 1 to 4 are listed in Table-1.

The shape of the aspheric surface is expressed in the coordinates with an X axis in the axial direction and a Y axis in the direction perpendicular to the optical axis, the direction in which light advances being taken as positive, by the following equation:

$$X = \frac{(1/R)H^2}{1+\sqrt{1-(1+K)(Y/R)^2}} + BH^4 + CH^6 + DH^8 + EH^{10} + FH^{12}$$

where R is the radius of the osculating sphere, and K, B, C, D, E and F are the aspheric coefficients.

The notation "e−0X" means "$\times 10^{-X}$".

NUMERICAL EXAMPLE 1

| f = 23.85~67.91 | Fno = 4.60~10.2 | 2ω = 71.9°~28.6° | |
|---|---|---|---|
| R 1 = −94.596 | D 1 = 1.63 | N 1 = 1.847000 | ν 1 = 23.8 |
| R 2 = −42.153 | D 2 = 0.82 | | |
| R 3 = −16.441 | D 3 = 1.00 | N 2 = 1.656922 | ν 2 = 57.2 |
| R 4 = −4436.504 | D 4 = 0.53 | | |
| R 5 = 2095.759 | D 5 = 3.79 | N 3 = 1.496978 | ν 3 = 69.0 |
| R 6 = −6.037 | D 6 = 1.00 | N 4 = 1.822592 | ν 4 = 34.5 |
| R 7 = −9.683 | D 7 = 0.20 | | |
| R 8 = −30.316 | D 8 = 2.27 | N 5 = 1.501953 | ν 5 = 68.4 |
| R 9 = −8.749 | D 9 = 1.00 | | |
| R10 = Stop | D10 = Variable | | |
| R11 = −37.487 | D11 = 2.29 | N 6 = 1.840778 | ν 6 = 24.3 |
| R12 = −20.739 | D12 = 3.37 | | |
| R13 = −8.553 | D13 = 1.70 | N 7 = 1.796590 | ν 7 = 43.7 |
| R14 = −65.412 | | | |

| Variable | Focal Length | | |
|---|---|---|---|
| Separation | 23.85 | 40.16 | 67.91 |
| D10 | 9.34 | 4.24 | 1.20 |

Aspheric Coefficients:

| R 4: | K = −7.18122e + 06 | A = 0 | B = 3.55653e − 04 |
|---|---|---|---|
| | C = 7.08831e − 06 | D = −1.25702e − 07 | E = 7.99110e − 09 |
| R11: | K = 0.00000e + 00 | A = 0 | B = 7.70000e − 05 |
| | C = 3.84960e − 07 | D = 1.25360e − 08 | E = 0.00000e + 00 |
| R14: | K = 0.00000e + 00 | A = 0 | B = −1.30200e − 05 |
| | C = −2.17120e − 08 | D = 3.42430e − 10 | E = 0.00000e + 00 |

Phase Coefficients:

| R11: | C2 = −4.79650e − 04 | C4 = −1.86720e − 06 | C6 = −4.19190e − 07 |
|---|---|---|---|
| R14: | C2 = 8.79170e − 04 | C4 = −1.01810e − 05 | C6 = 1.33450e − 07 |

NUMERICAL EXAMPLE 2

| f = 23.86~77.89 | Fno = 4.60~11.8 | 2ω = 71.9°~25.1° | |
|---|---|---|---|
| R 1 = −197.787 | D 1 = 2.07 | N 1 = 1.847000 | ν 1 = 23.8 |
| R 2 = −38.741 | D 2 = 1.16 | | |
| R 3 = −18.530 | D 3 = 1.50 | N 2 = 1.655209 | ν 2 = 57.3 |
| R 4 = 27.993 | D 4 = 0.87 | | |
| R 5 = 57.839 | D 5 = 4.01 | N 3 = 1.521990 | ν 3 = 66.3 |
| R 6 = −6.280 | D 6 = 1.00 | N 4 = 1.836409 | ν 4 = 33.6 |
| R 7 = −10.934 | D 7 = 0.20 | | |
| R 8 = −48.093 | D 8 = 2.38 | N 5 = 1.487000 | ν 5 = 70.2 |
| R 9 = −8.714 | D 9 = 1.00 | | |
| R10 = Stop | D10 = Variable | | |
| R11 = −32.337 | D11 = 3.00 | N 6 = 1.783760 | ν 6 = 25.7 |
| R12 = −18.034 | D12 = 3.19 | | |
| R13 = −8.269 | D13 = 1.70 | N 7 = 1.804000 | ν 7 = 46.6 |
| R14 = −47.749 | | | |

| Variable | Focal Length | | |
|---|---|---|---|
| Separation | 23.86 | 45.18 | 77.89 |
| D10 | 10.70 | 4.44 | 1.59 |

Aspheric Coefficients:

| R 4: | K = 9.32012e + 00 | A = 0 | B = 2.97166e − 04 |
|---|---|---|---|
| | C = 6.86710e − 06 | D = −1.21843e − 07 | E = 8.35579e − 09 |
| R11: | K = 0.00000e + 00 | A = D | B = 8.77570e − 05 |
| | C = 5.37770e − 07 | D = 3.17160e − 09 | E = 2.63280e − 10 |
| R14: | K = 0.00000e + 00 | A = 0 | B = −1.38010e − 05 |
| | C = −9.42140e − 08 | D = 5.45870e − 10 | E = 2.46120e − 12 |

Phase Coefficients:

| R11: | C2 = −4.90390e − 04 | C4 = −2.20400e − 06 | C6 = −3.65960e − 07 |
|---|---|---|---|
| R14: | C2 = 8.62300e − 04 | C4 = −5.75750e − 06 | C6 = 8.94710e − 08 |

NUMERICAL EXAMPLE 3

| f = 23.90~67.55 | Fno = 4.60~10.2 | 2ω = 71.8°~28.7° | |
|---|---|---|---|
| R 1 = −247.607 | D 1 = 1.81 | N 1 = 1.847000 | ν 1 = 23.8 |
| R 2 = −40.615 | D 2 = 0.89 | | |
| R 3 = −16.930 | D 3 = 1.50 | N 2 = 1.766092 | ν 2 = 50.0 |
| R 4 = 221.135 | D 4 = 0.77 | | |
| R 5 = −135.059 | D 5 = 3.93 | N 3 = 1.498400 | ν 3 = 68.8 |
| R 6 = −6.301 | D 5 = 1.00 | N 4 = 1.835069 | ν 4 = 35.5 |
| R 7 = −10.087 | D 7 = 0.20 | | |
| R 8 = −54.743 | D 8 = 2.36 | N 5 = 1.487000 | ν 5 = 70.2 |
| R 9 = −9.034 | D 9 = 1.00 | | |
| R10 = Stop | D10 = Variable | | |
| R11 = −209.118 | D11 = 3.00 | N 6 = 1.752368 | ν 6 = 26.8 |
| R12 = −42.068 | D12 = 4.00 | | |
| R13 = −9.034 | D13 = 1.70 | N 7 = 1.804000 | ν 7 = 46.6 |
| R14 = −63.685 | | | |

| Variable | Focal Length | | |
|---|---|---|---|
| Separation | 23.90 | 40.13 | 67.55 |
| D10 | 9.79 | 4.41 | 1.20 |

Aspheric Coefficients:

| R 4: | K = −4.28326e + 02 | A = 0 | B = 2.99959e − 04 |
|---|---|---|---|
| | C = 3.54916e − 06 | D = −1.89271e − 08 | E = 3.34995e − 09 |
| R11: | K = 0.00000e + 00 | A = 0 | B = 1.06890e − 04 |
| | C = −1.22730e − 06 | D = 5.83130e − 08 | E = −4.12590e − 10 |
| R12: | K = 0.00000e + 00 | A = 0 | B = 3.30780e − 05 |
| | C = −1.75770e − 06 | D = 3.00620e − 08 | E = 0.00000e + 00 |

Phase Coefficients:

| R11: | C2 = −3.06910e − 03 | C4 = 1.62120e − 05 | C6 = −6.15870e − 07 |
|---|---|---|---|
| R12: | C2 = 3.64800e − 03 | C4 = −2.88170e − 05 | C6 = 7.97600e − 07 |

NUMERICAL EXAMPLE 4

| f = 38.92~126.73 | Fno = 5.76~5.42 | 2ω = 58.14°~19.38° | |
|---|---|---|---|
| *R 1 = 75.014 | D 1 = 1.20 | N 1 = 1.82782 | ν 1 = 38.1 |
| R 2 = 36.017 | D 2 = 0.50 | | |
| R 3 = 13.993 | D 3 = 3.42 | N 2 = 1.48700 | ν 2 = 70.2 |
| R 4 = 82.719 | D 4 = Variable | | |
| R 5 = Stop | D 5 = 3.69 | | |
| +R 6 = −8.441 | D 6 = 1.00 | N 3 = 1.69700 | ν 3 = 55.5 |
| R 7 = −12.133 | D 7 = 0.50 | | |
| R 8 = −307.724 | D 8 = 2.94 | N 4 = 1.55052 | ν 4 = 59.3 |
| *R 9 = −11.265 | D 9 = Variable | | |
| +R10 = −30.421 | D10 = 1.50 | N 5 = 1.69700 | ν 5 = 55.5 |
| R11 = −7430.414 | D11 = 5.49 | | |

-continued

| | | | |
|---|---|---|---|
| +R12 = −13.234 | D12 = 2.00 | N 6 = 1.48700 | υ 6 = 70.2 |
| *R13 = −33.690 | | | |

*) Aspheric Surface
+) Diffractive Surface

| Variable | Focal Length | | |
|---|---|---|---|
| Separation | 38.92 | 79.97 | 126.73 |
| D 4 | 4.36 | 10.29 | 12.93 |
| D 9 | 11.32 | 3.98 | 1.00 |

Aspheric Coefficients:

| R 1: | K = 0 | A = 0 | B = −7.51992e − 96 | C = −4.57911e − 08 |
| | | | D = 7.30471e − 10 | E = −5.87828e − 12 |
| R 9: | K = 0 | A = 0 | B = 5.52154e − 05 | C = 1.05529e − 06 |
| | | | D = −2.95477e − 08 | E = 5.45340e − 10 |
| R13: | K = 0 | A = 0 | B = −2.03875e − 05 | C = −2.49625e − 08 |
| | | | D = −9.31610e − 11 | E = −7.82077e − 13 |

Phase Coefficients:

| R 6: | C2 = −1.04560e − 03 | C4 = 1.21620e − 05 | C6 = −3.71980e − 07 |
| R10: | C2 = 4.22840e − 04 | C4 = −1.06180e − 05 | C6 = 4.44520e − 08 |
| R12: | C2 = 7.38750e − 04 | C4 = 9.47110e − 07 | C6 = 1.33070e − 08 |

TABLE 1

| Condition No. & Factor | Numerical Example | | | |
|---|---|---|---|---|
| | 1 | 2 | 3 | 4 |
| (1) $C_{2a}$ | −4.8 ×10$^{-4}$ | −4.9 ×10$^{-4}$ | −3.07 ×10$^{-3}$ | — |
| (2) $C_{2b}$ | 8.79 ×10$^{-4}$ | 8.62 ×10$^{-4}$ | 3.65 ×10$^{-3}$ | — |
| (3) $C_{2a}$ × fW | −1.14 ×10$^{-2}$ | −1.17 ×10$^{-2}$ | −7.33 ×10$^{-2}$ | — |
| (4) $|C_{2b}|/|C_{2a}|$ | 1.833 | 1.758 | 1.189 | 1.747 |
| (5) $D_{ab}$/fW | 0.31 | 0.33 | 0.13 | 0.18 |
| (6) β2T/β2W | 2.85 | 3.26 | 2.83 | — |

It will be appreciated from the foregoing that, as, for example, the two-unit or three-unit zoom lens has a positive movable lens unit lying closest to the object side and a negative movable lens unit lying closest to the image side, the invention allows a plurality of diffractive optical elements to be utilized advantageously. A zoom lens of high range while still maintaining high optical performance throughout can thus be achieved.

What is claimed is:

1. A zoom lens comprising:

a plurality of lens units, said plurality of lens units including a movable lens unit having a negative refractive power lying closest to an image side, said movable lens unit having, in order from an object side, a first diffractive optical element and a second diffractive optical element, wherein, where $C_{2a}$ is a phase coefficient in the second order in an equation for phase shape of said first diffractive optical element and $C_{2b}$ is a phase coefficient in the second order in an equation for phase shape of said second diffractive optical element, the following condition is satisfied:

$$0.7 < |C_{2b}|/|C_{2a}| < 3.0,$$

and wherein said equation for phase shape is expressed by $$\phi(h) = (2\pi/\lambda)(C_2 \cdot h^2 + C_4 \cdot h^4 + \ldots + C_n \cdot h^n)$$

where h is a height from an optical axis, $\lambda$ is a reference wavelength, $C_n$ is a phase coefficient in the n-th order, and $\phi(h)$ is the phase shape.

2. A zoom lens comprising:

a plurality of lens units, said plurality of lens units including a movable lens unit having a negative refractive power lying closest to an image side, said movable lens unit having, in order from an object side, a first diffractive optical element and a second diffractive optical element, wherein the following condition is satisfied:

$$0.05 < D_{ab}/fw < 0.6$$

where $D_{ab}$ is a distance in an optical axis direction between said first diffractive optical element and said second diffractive optical element, and fw is a focal length at a wide-angle end of said zoom lens.

3. A zoom lens of two-unit type, comprising, in order from an object side:

a movable lens unit having a positive refractive power; and a movable lens unit having a negative refractive power, said negative movable lens unit having, in order from the object side, a first diffractive optical element of positive refractive power and a second diffractive optical element of negative refractive power, wherein, where $C_{2a}$ is a phase coefficient in the second order in an equation for phase shape of said first diffractive optical element and $C_{2b}$ is a phase coefficient in the second order in an equation for phase shape of said second diffractive optical element, the following condition is satisfied:

$$0.7 < |C_{2b}|/|C_{2a}| < 3.0,$$

and wherein said equation for phase shape is expressed by $$\phi(h) = (2\pi/\lambda)(C_2 \cdot h^2 + C_4 \cdot h^4 + \ldots + C_n \cdot h^n)$$

where h is a height from an optical axis, $\lambda$ is a reference wavelength, $C_n$ is a phase coefficient in the n-th order, and $\phi(h)$ is the phase shape.

4. A zoom lens of three-unit type, comprising, in order from an object side:

a movable lens unit having a positive refractive power;

a movable lens unit having a positive refractive power, said positive movable lens unit having a first diffractive optical element of positive refractive power; and a movable lens unit having a negative refractive power, said negative movable lens unit having, in order from the object side, a second diffractive optical element of negative refractive power and a third diffractive optical element of negative refractive power, wherein, where $C_{2a}$ is a phase coefficient in the second order in an equation for phase shape of said first diffractive optical element and $C_{2b}$ is a phase coefficient in the second order in an equation for phase shape of said second diffractive optical element, the following condition is satisfied:

$$0.7 < |C_{2b}|/|C_{2a}| < 3.0,$$

and wherein said equation for phase shape is expressed by $$\phi(h) = (2\pi/\lambda)(C_2 \cdot h^2 + C_4 \cdot h^4 + \ldots + C_n \cdot h^n)$$

where h is a height from an optical axis, $\lambda$ is a reference wavelength, $C_n$ is a phase coefficient in the n-th order, and $\phi(h)$ is the phase shape.

5. A zoom lens of two-unit type, comprising, in order from an object side:

a movable lens unit having a positive refractive power; and a movable lens unit having a negative refractive power, said negative movable lens unit having, in order from the object side, a first diffractive optical element of positive refractive power and a second diffractive optical element of negative refractive power, wherein the following condition is satisfied:

$$0.05 < D_{ab}/fw < 0.6$$

where $D_{ab}$ is a distance in an optical axis direction between said first diffractive optical element and said second diffractive optical element, and fw is a focal length at a wide-angle end of said zoom lens.

6. A zoom lens of three-unit type, comprising, in order from an object side:

a movable lens unit having a positive refractive power;

a movable lens unit having a positive refractive power, said positive movable lens unit having a first diffractive optical element of positive refractive power; and a movable lens unit having a negative refractive power, said negative movable lens unit having, in order from the object side, a second diffractive optical element of negative refractive power and a third diffractive optical element of negative refractive power, wherein the following condition is satisfied:

$$0.05 < D_{ab}/fw < 0.6$$

where $D_{ab}$ is a distance in an optical axis direction between said first diffractive optical element and said second diffractive optical element, and fw is a focal length in a wide-angle end of said zoom lens.

7. A zoom lens according to any one of claims 1, 3 and 4, further satisfying:

$$1.0 < |C_{2b}|/|C_{2a}| < 2.0.$$

8. A zoom lens according to any one of claims 2, 5 and 6, further satisfying:

$$0.1 < D_{ab}/fw < 0.4.$$

9. A zoom lens of two-unit type, comprising, in order from an object side:

a movable lens unit having a positive refractive power; and a movable lens unit having a negative refractive power, said negative movable lens unit having, in order from the object side, a first diffractive optical element of positive refractive power and a second diffractive optical element of negative refractive power.

10. A zoom lens comprising:

a plurality of lens units, said plurality of lens units including a movable lens unit having a negative refractive power lying closest to an image side, said movable lens unit having, in order from an object side, a first diffractive optical element of positive refractive power and a second diffractive optical element of negative refractive power.

11. A zoom lens according to claim 9 or 10, wherein, where $C_{2a}$ is a phase coefficient in the second order in an equation for phase shape of said first diffractive optical element, and fw is a focal length at a wide-angle end of said zoom lens, the following condition is satisfied:

$$-9 \times 10^{-2} < C_{2a} \times fw < -5 \times 10^{-3},$$

and wherein said equation for phase shape is expressed by $$\phi(h) = (2\pi/\lambda)(C_2 \cdot h^2 + C_4 \cdot h^4 + \ldots + C_n \cdot h^n)$$

where h is a height from an optical axis, $\lambda$ is a reference wavelength, $C_n$ is a phase coefficient in the n-th order, and $\phi(h)$ is the phase shape.

12. A zoom lens according to claim 11, further satisfying:

$$-8 \times 10^{-2} < C_{2a} \times fw < -1 \times 10^{-2}.$$

13. A zoom lens of two-unit type, comprising, in order from an object side:

a movable lens unit having a positive refractive power; and a movable lens unit having a negative refractive power, said negative movable lens unit having, in order from the object side, a first diffractive optical element and a second diffractive optical element, wherein, where $C_{2a}$ is a phase coefficient in the second order in an equation for phase shape of said first diffractive optical element, and fw is a focal length at a wide-angle end of said zoom lens, the following condition is satisfied:

$$-9 \times 10^{-2} < C_{2a} - fw < -5 \times 10^{-3},$$

and wherein said equation for phase shape is expressed by $$\phi(h) = (2\pi/\lambda)(C_2 \cdot h^2 + C_4 \cdot h^4 + \ldots + C_n \cdot h^n)$$

where h is a height from an optical axis, $\lambda$ is a reference wavelength, $C_n$ is a phase coefficient in the n-th order, and $\phi(h)$ is the phase shape.

14. A zoom lens comprising:

a plurality of lens units, said plurality of lens units including a movable lens unit having a negative refractive power lying closest to an image side, said movable lens unit having, in order from an object side, a first diffractive optical element and a second diffractive optical element, wherein, where $C_{2a}$ is a phase coefficient in the second order in an equation for phase shape of said first diffractive optical element, and fw is a focal length at a wide-angle end of said zoom lens, the following condition is satisfied:

$$-9 \times 10^{-2} < C_{2a} \times fw < -5 \times 10^{-3},$$

and wherein said equation for phase shape is expressed by $$\phi(h) = (2\pi/\lambda)(C_2 \cdot h^2 + C_4 \cdot h^4 + \ldots + C_n \cdot h^n)$$

where h is a height from an optical axis, $\lambda$ is a reference wavelength, $C_n$ is a phase coefficient in the n-th order, and $\phi(h)$ is the phase shape.

15. A zoom lens according to claim 13 or 14, further satisfying:

$$-8\times10^{-2}<C_{2a}\times fw<-1\times10^{-2}.$$

16. A zoom lens of three-unit type, comprising, in order from an object side:

a movable lens unit having a positive refractive power;

a movable lens unit having a positive refractive power, said positive movable lens unit having a first diffractive optical element of positive refractive power; and a movable lens unit having a negative refractive power, said negative movable lens unit having, in order from the object side, a second diffractive optical element of negative refractive power and a third diffractive optical element of negative refractive power.

* * * * *

UNITED STATES PATENT AND TRADEMARK OFFICE
CERTIFICATE OF CORRECTION

PATENT NO.    : 6,219,190 B1
DATED         : April 17, 2001
INVENTOR(S)   : Yoshinori Itoh It is certified that error appears in the above-identified patent and that said Letters Patent is hereby corrected as shown below:

Column 1,
Line 7, "with" should be deleted.

Column 4,
Line 16, "fabricating" should read -- fabricate --.

Column 6,
Line 29, "Dab" should read -- $D_{ab}$ --.

Column 7,
Line 2, "numerical 4" should read -- numerical example 4 --.

Column 8,
Line 8, "lower" should read -- lowering --.
Line 55, "dust proof" should read -- dust-proof --.

Column 10,
Line 6, "1.59" should read -- 1.50 --.
Line 57, "5.42" should read -- 15.42 --.

Column 11,
Line 63, "$|C_{2a}$" should read -- $|C_{2a}|$ --.

Signed and Sealed this

Thirtieth Day of April, 2002

Attest:

*Attesting Officer*

JAMES E. ROGAN
*Director of the United States Patent and Trademark Office*